United States Patent [19]

Tulio

[11] Patent Number: 4,753,376
[45] Date of Patent: Jun. 28, 1988

[54] AUTOMOBILE BUMPER CLEAT FOR MOUNTING ACCESSORIES

[76] Inventor: Vincent Tulio, P.O. Box 445, Warrington, Pa. 18976

[21] Appl. No.: 27,310

[22] Filed: Mar. 18, 1987

[51] Int. Cl.⁴ .......................... B60R 19/48; B65R 9/06
[52] U.S. Cl. ...................... 224/42.03 R; 224/42.45 R; 248/220.2; 248/503; 248/674; 293/117; 403/205
[58] Field of Search ................. 224/43.03 R, 43.03 A, 224/42.07, 42.08, 42.45 R, 42.32, 42.33, 273; 403/199, 232.1, 332, 205; 248/503, 500, 501, 220.1, 205.1, 674, 675, 300, 158, 200, 220.2, 314, 309.1, 316.8; 293/117; 52/732

[56] References Cited

U.S. PATENT DOCUMENTS

| 154,953 | 9/1874 | Kelley et al. ........................ 403/205 |
| 1,778,788 | 10/1920 | Benedict ........................... 224/42.08 |
| 1,983,187 | 12/1934 | Oswell .............................. 224/42.33 |
| 2,168,911 | 8/1939 | Meyer ................................ 403/205 |
| 3,989,397 | 11/1976 | Baker ................................ 403/205 |
| 4,035,979 | 7/1977 | Koreska ........................... 52/732 X |
| 4,411,461 | 10/1983 | Rosenberg ............... 224/42.03 A X |
| 4,413,761 | 11/1983 | Angel ........................... 224/42.45 R |
| 4,436,343 | 3/1984 | Schneider ...................... 403/205 X |
| 4,438,875 | 3/1984 | Fritsch ........................ 224/42.03 R |
| 4,620,736 | 11/1986 | Shanks ........................ 224/42.03 R |

FOREIGN PATENT DOCUMENTS

| 355770 | 1/1938 | Italy ..................................... 403/205 |
| 2126682 | 3/1984 | United Kingdom ............... 403/205 |

Primary Examiner—Henry J. Recla
Assistant Examiner—Ernest G. Cusick
Attorney, Agent, or Firm—Gregory J. Gore

[57] ABSTRACT

A bumper cleat provides a lift-off mount for bumper secured motor vehicle accessories. Two vertically oriented L-shaped walls form an L-shaped channel between them which secures a mating L-shaped foot for an accessory frame. Fasteners are employed to secure the accessory frame vertically. The L-shaped channel provides retention from movement in two planes while allowing for water drainage to prevent ice buildup or rust.

1 Claim, 1 Drawing Sheet

AUTOMOBILE BUMPER CLEAT FOR MOUNTING ACCESSORIES

FIELD OF THE INVENTION

This invention relates to carriers which are mounted on the bumpers of cars or trucks.

BACKGROUND OF THE INVENTION

Many accessories are often used with vehicles, such as trucks, which increase the usefulness of the vehicle. These accessories often include carriers which add to the load capacity of the vehicle. These carriers are typically bumper mounted, providing the main point of attachment to the vehicle. The accessory carriers are often made detachable for intermittent or seasonal use. One such application is an accessory salt spreader which is mounted to the rear of a light truck. In the past, salt spreaders have been bolted directly to the body and bumper of the vehicle. When applied to light trucks having a tailgate, this accessory prohibits the use of the tailgate when installed. Furthermore, it is difficult to remove the salt spreader accessory which must be bolted or unbolted from the frame or bumper of the vehicle each time it is installed or taken down so that the tail gate may be used.

SUMMARY OF THE INVENTION

It is therefore an object of the present invention to provide a device which will permit accessory carriers, such as salt spreaders, to be easily and quickly removed and reinstalled. This objective is achieved through the use of a novel bumper cleat which has a vertical L-shaped channel for receiving a mating L-shaped foot of an accessory frame. The L-shaped channel further includes open-divergent ends so that different sized L-shaped frame pieces can be accommodated and also for water drainage. The bumper cleat further includes mounting apertures along one leg of the mounting channel so that a fastener can be installed to vertically secure the mating frame piece. In this way, one fastener, such as a nut and bolt combination, can securely affix the foot of a frame member from motion in all three planes.

It should be understood that while the present bumper cleat is shown used as a convenient attachment means for salt spreaders, it can be used equally for other accessories and attachments which are used with motor vehicles. Other objects and advantages of the present invention will be readily understood from the following drawings and further description.

DESCRIPTION OF THE PREFERRED EMBODIMENT

Figure 1:
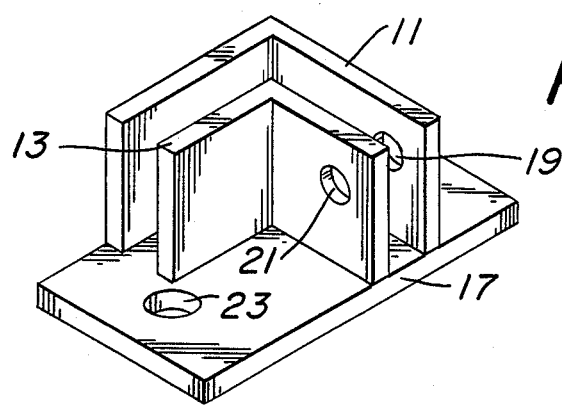
FIG. 1 shows a front and top isometric view of the bumper cleat.

Referring now to FIG. 1, the present invention is shown containing two L-shaped vertical support pieces 11 and 13 in spaced relation which together form an L-shaped channel 15 between them. A base plate 17 is welded across the bottom of the L-shaped pieces to maintain their parallel alignment and also to serve as a mounting plate to a vehicle bumper as further shown in FIG. 2. Mounting holes 19 and 21 receive bolt means for securing the vertical frame members. At least one mounting hole(s) 23 on each cleat permits the base of each cleat to be bolted directly to the vehicle bumper. Mounting holes 23 permit the base of the cleat to be bolted directly to the vehicle bumper.

Figure 2:
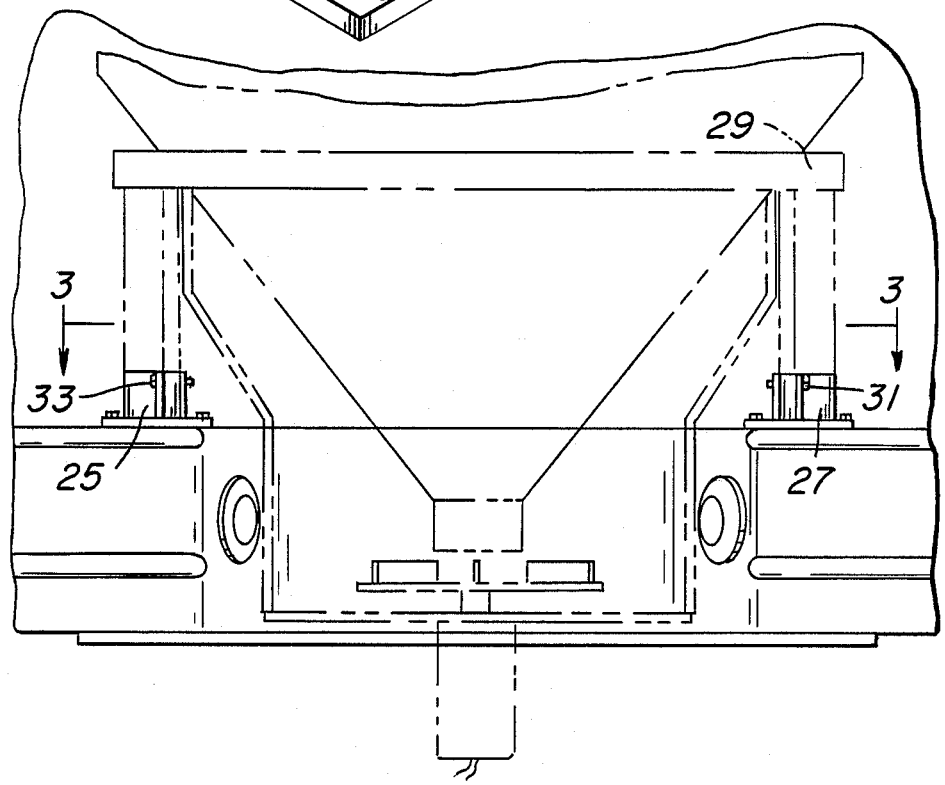
FIG. 2 shows a rear view of two bumper cleats installed on the rear of a light truck.
Figure 3:
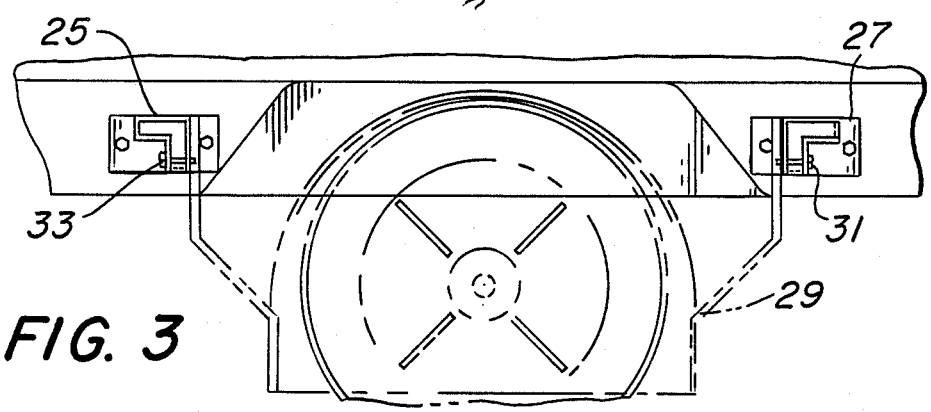
FIG. 3 is a top sectional view taken from FIG. 2 showing the orientation of bumper cleats from above.

Referring now to FIG. 2, a pair of cleats 25 and 27, are shown supporting two feet which are extensions of the carrier frame 29 for a salt spreader. It can readily be seen from this figure and also FIG. 3 that when secured in this manner, only two bolts 31 and 33 are needed to secure the frame of the salt spreader from motion in all three planes. It can also readily be seen that after bolt means 31 and 33 have been removed that the frame may be lifted vertically up and out of both cleat channels. While the preferred embodiment shows the invention used with salt spreaders, it can be easily appreciated that this mounting device may be used in conjunction with any accessory which is intended for intermittent use and which is attached to the bumper of a vehicle. Other uses include mountings for bicycle carriers, trailer hitches, ski racks, etc. Furthermore, the mounting device may be used on agricultural equipment to attach a wide variety of farm implements.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A motor vehicle bumper and cleat for mounting accessories, comprising:
  a. a horizontal vehicle bumper having a substantially flat top portion;
  b. a horizontal base plate having a top and apertures therein bolted to the top portion of said bumper by bolt means passing through said apertures in said base plate,
  c. a first vertical L-shaped member with sides perpendicular to and affixed to the top of said base plate, said member having at least one mounting hole;
  d. a second vertical L-shaped member affixed to the top of said base plate having sides parallel to the sides of said first L-shaped member,
  e. an open L-shaped channel formed between said first and said second L-shaped members,
  f. a vertical L-shaped accessory frame foot fitted within said L-shaped channel, said frame foot being in contacting relationship with said base plate, and
  g. said first vertical L-shaped member, said second vertical L-shaped member, and said vertical L-shaped accessory frame foot having aligned apertures,
  h. a single releasable horizontal bolt passing through said aligned apertures in said frame foot, said first L-shaped member and said second L-shaped member to confine said frame foot within said L-shaped channel, thereby securing said accessory frame foot to said bumper.

* * * * *